T. C. BURNHAM.
Cotton-Cultivators.

No. 152,069. Patented June 16, 1874.

WITNESSES:
E. Wolff
D. Sedgwick

INVENTOR:
T. C. Burnham
BY Munn & Co
ATTORNEYS.

AM. PHOTO-LITHOGRAPHIC Co. N.Y. (OSBORNE'S PROCESS.)

UNITED STATES PATENT OFFICE.

THEODORE C. BURNHAM, OF WACO, TEXAS.

IMPROVEMENT IN COTTON-CULTIVATORS.

Specification forming part of Letters Patent No. 152,069, dated June 16, 1874; application filed December 13, 1873.

*To all whom it may concern:*

Figure 1:
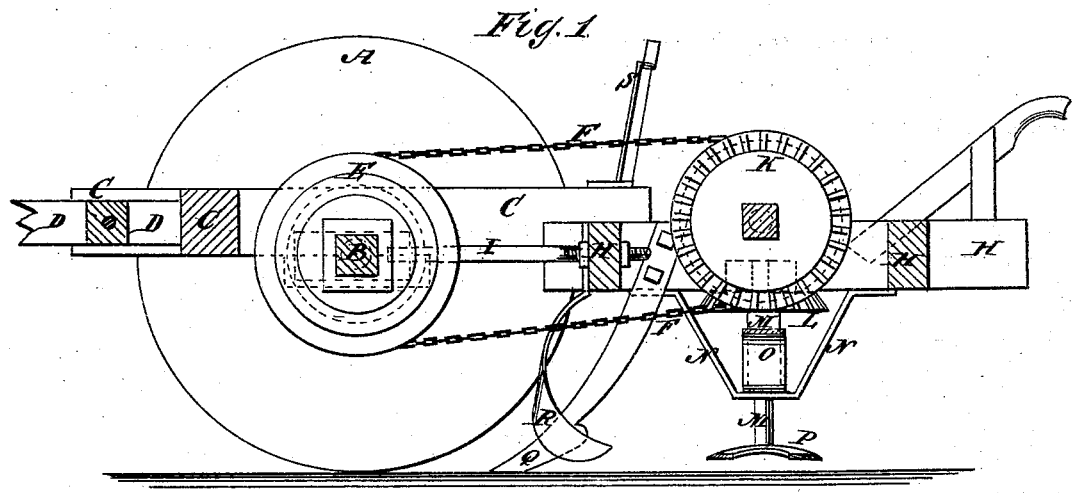
Figure 2:
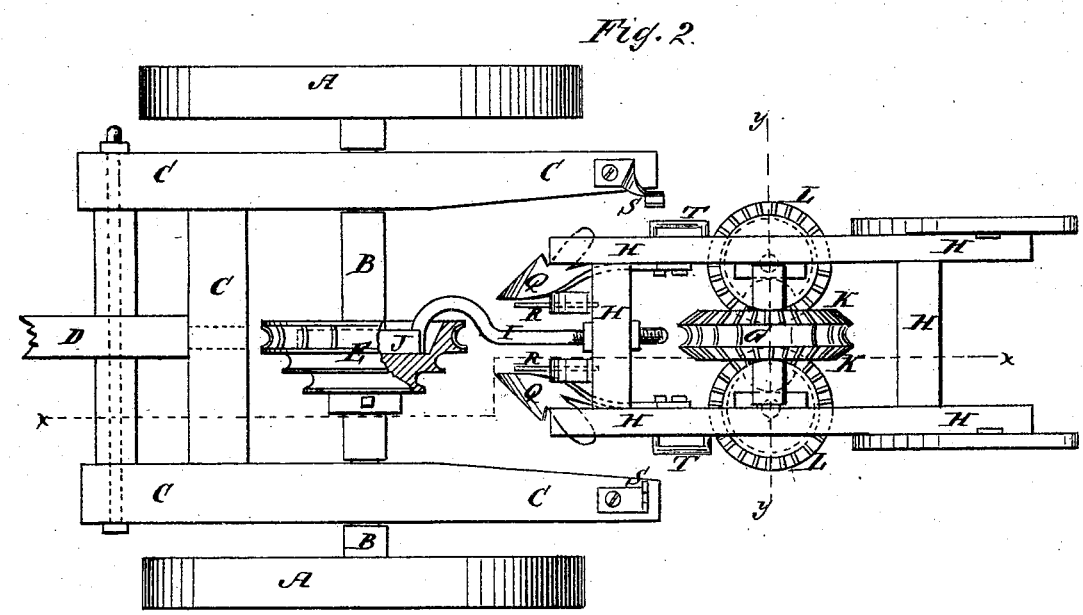
Figure 3:
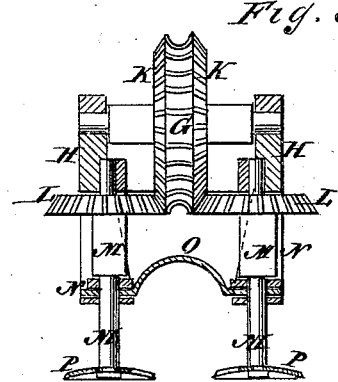

Be it known that I, THEODORE C. BURNHAM, of Waco, in the county of McLennan and State of Texas, have invented a new and useful Improvement in Cotton-Cultivator, of which the following is a specification:

Figure 1 is a detail vertical longitudinal section of my improved machine, taken through the line $x\ x$, Fig. 2. Fig. 2 is a top view of the same. Fig. 3 is a vertical cross-section of the same, taken through the line $y\ y$, Fig. 2.

Similar letters of reference indicate corresponding parts.

The invention will first be fully described, and then pointed out in the claims.

A are the drive-wheels, which are secured to the axle B, so as to carry it with them in their revolution. The axle B revolves in bearings attached to the frame C, to the forward end of which is attached the tongue D, by which the machine is guided. To the axle B is attached a cone chain-wheel, E, around which passes the endless chain F, which also passes around a chain-wheel, G, the journals of which revolve in bearings attached to the frame H. To the front cross-bar of the frame H is secured the rear end of the rod I by nuts screwed upon the said rod upon the opposite sides of the said cross-bar. The forward end of the rod I is hinged to the end of a block, J, that rides upon the axle B in a cavity formed in the side of the cone chain-wheel E, as shown in Fig. 2, the said rod I having a bend or bow formed in it to pass around the rim of the said cone-wheel E, as shown in Fig. 2. The chain cone-wheel E is secured to the axle B by a set-screw passing through its hub. To the opposite sides of the chain-wheel G are attached the bevel-gear wheels K, the teeth of which mesh into the teeth of the bevel-gear wheels L, attached to the upper parts of the vertical shafts M. The upper ends of the vertical shafts M revolve in bearings attached to the frame H, and the middle parts of said shafts revolve in brackets N, attached to the frame H, and in holes in the ends of the cross strap or bar O, by which they are held at the desired distance apart, and the middle part of which is arched or bowed to enable it to pass over the plants without injuring them. To the lower ends of the shafts M are attached circular cutters P, made slightly convex upon their upper side and slightly concave upon their lower side, and in one side of each of which is formed a semicircular notch about six inches in diameter. The cutters P are so arranged that the notches of the two cutters may be directly opposite each other, so as to leave an uncut space about six inches in diameter every time the notches of the cutters come together as the machine is drawn forward. Q are plows, the standards of which are attached to the forward part of the frame H in proper position to bar off the plants in front of the cutters P, which cutters will thus have to cut only through the ridge of soil left between the furrows made by the plows Q. R are guards, the standards of which are attached to the forward part of the frame H, and which are so formed that the guards may be supported at the inner sides of the plows Q, to guard the plants from being injured by clods, stones, or rubbish thrown against them by the plows Q. S are bars attached to the rear part of the side bars of the frame C, to receive the staples T, attached to the sides of the frame H, so as to support the cutters and plows of the said frame away from the ground, for convenience in turning and passing from place to place. To the rear part of the frame H are attached the handles U, by which the plows and cutters are guided and controlled.

The standards of the guards R are elastic, so that the guards may yield in passing over clods, rocks, and other obstructions, and return to their places as soon as the obstruction has been passed.

Having thus described my invention, I claim as new and desire to secure by Letters Patent—

1. The combination, with the cone-wheel E and axle B, of the block J and bowed connecting-rod I, as and for the purpose described.

2. The combination, in a cotton-cultivator of two horizontal circular cutters or hoes, P P, bottom-concaved, and having opposite semicircular openings, as and for the purpose specified.

3. The combination, in a cultivator, of the rotary hoes or cutters P P, the bar-plows Q Q, and fenders or guards R R, as and for the purpose described.

4. The frame C, having extended and open ends, with bars S, combined with the vibrating frame H, connected by rod I, and having staples T, as and for the purpose set forth.

T. C. BURNHAM.

Witnesses:
L. B. WALTON,
WM. HETH.